United States Patent
Khandani

(10) Patent No.: US 10,177,896 B2
(45) Date of Patent: Jan. 8, 2019

(54) METHODS FOR TRAINING OF FULL-DUPLEX WIRELESS SYSTEMS

(71) Applicant: Amir Keyvan Khandani, Kitchener (CA)

(72) Inventor: Amir Keyvan Khandani, Kitchener (CA)

(73) Assignee: Amir Keyvan Khandani, Kitchener (CA)

( * ) Notice: Subject to any disclaimer, the term of this patent is extended or adjusted under 35 U.S.C. 154(b) by 0 days.

(21) Appl. No.: 15/431,764

(22) Filed: Feb. 13, 2017

(65) Prior Publication Data

US 2017/0237545 A1     Aug. 17, 2017

Related U.S. Application Data

(60) Provisional application No. 62/294,913, filed on Feb. 12, 2016.

(51) Int. Cl.
| | |
|---|---|
| *H04L 15/14* | (2006.01) |
| *H04B 17/14* | (2015.01) |
| *H04B 17/336* | (2015.01) |
| *H04B 17/345* | (2015.01) |
| *H04L 5/14* | (2006.01) |

(52) U.S. Cl.
CPC .............. *H04L 5/14* (2013.01); *H04B 17/14* (2015.01); *H04B 17/336* (2015.01); *H04B 17/345* (2015.01)

(58) Field of Classification Search
CPC ......... H04L 5/14; H04B 17/14; H04B 17/336; H04B 17/345
See application file for complete search history.

(56) References Cited

U.S. PATENT DOCUMENTS

| | | | |
|---|---|---|---|
| 3,725,920 | A | 4/1973 | Hossmann |
| 4,268,727 | A | 5/1981 | Agrawal |
| 4,750,165 | A | 6/1988 | Champagne |
| 5,383,224 | A | 1/1995 | Mizoguchi |
| 5,388,124 | A | 2/1995 | Laroia |
| 5,691,978 | A | 11/1997 | Kenworthy |
| 5,805,116 | A | 9/1998 | Morley |
| 6,317,092 | B1 | 11/2001 | de Schweinitz |

(Continued)

FOREIGN PATENT DOCUMENTS

| | | |
|---|---|---|
| EP | 2180623 | 4/2010 |
| GB | 1091437 | 11/1967 |

(Continued)

OTHER PUBLICATIONS

Extended European Search Report for EP App. 14865287.8, dated Jul. 4, 2017. 7 Pages.

(Continued)

*Primary Examiner* — Ronald B Abelson

(74) *Attorney, Agent, or Firm* — Invention Mine LLC

(57) ABSTRACT

A method and apparatus for (a) operating a first full-duplex transceiver to exchange radio-frequency signals with a second full-duplex transceiver, (b) determining at the first full-duplex transceiver that a residual self-interference signal exceeds a threshold, (c) in response to the determination that the residual self-interference signal exceeds the threshold, performing a self-training operation.

15 Claims, 5 Drawing Sheets

(56) References Cited

U.S. PATENT DOCUMENTS

| | | |
|---|---|---|
| 6,608,864 B1 | 8/2003 | Strait |
| 6,621,876 B2 | 9/2003 | Camp, Jr. |
| 6,731,908 B2 | 5/2004 | Berliner |
| 6,745,009 B2 | 6/2004 | Raghothaman |
| 6,870,515 B2 | 3/2005 | Kitchener |
| 6,917,597 B1 | 7/2005 | Schmidl |
| 7,002,518 B2 | 2/2006 | Lin |
| 7,065,036 B1 | 6/2006 | Ryan |
| 7,091,894 B2 | 8/2006 | Fudge |
| 7,096,042 B2 | 8/2006 | Marinier |
| 7,184,466 B1 | 2/2007 | Seemann |
| 7,187,907 B2 | 3/2007 | Widrow |
| 7,221,688 B2 | 5/2007 | Vanness |
| 7,263,143 B1 | 8/2007 | Rothaar |
| 7,272,366 B2 | 9/2007 | Haapoja |
| 7,286,096 B2 | 10/2007 | Jaffer |
| 7,321,611 B2 | 1/2008 | Fullerton |
| 7,346,100 B2 | 3/2008 | Kumar |
| 7,471,204 B2 | 12/2008 | Safarian |
| 7,482,058 B2 | 1/2009 | Ahmed |
| 7,627,325 B2 | 12/2009 | McCoy |
| 7,693,174 B2 | 4/2010 | Ishibashi |
| 7,706,744 B2 | 4/2010 | Rodgers |
| 7,817,641 B1 | 10/2010 | Khandani |
| 7,920,539 B2 | 4/2011 | Stanford |
| 7,944,871 B2 | 5/2011 | Imamura |
| 7,991,160 B2 | 8/2011 | Guccione |
| 8,023,438 B2 | 9/2011 | Kangasmaa |
| 8,031,744 B2 | 10/2011 | Radunovic |
| 8,064,502 B2 | 11/2011 | Sawai |
| 8,107,906 B2 | 1/2012 | Lum |
| 8,175,535 B2 | 5/2012 | Mu |
| 8,184,061 B2 | 5/2012 | Sanford |
| 8,208,628 B2 | 6/2012 | Yener |
| 8,238,551 B2 | 8/2012 | Reznik |
| 8,280,046 B2 | 10/2012 | Rudolf |
| 8,306,480 B2 | 11/2012 | Muhammad |
| 8,351,874 B2 | 1/2013 | Dent |
| 8,373,582 B2 | 2/2013 | Hoffberg |
| 8,385,235 B2 | 2/2013 | Chiu |
| 8,401,196 B2 | 3/2013 | Goldberg |
| 8,405,543 B2 | 3/2013 | Kluge |
| 8,498,585 B2 | 7/2013 | Vandenameele |
| 8,587,492 B2 | 11/2013 | Runyon |
| 8,628,650 B2 | 1/2014 | Ah |
| 8,629,650 B2 | 1/2014 | Mohammadian |
| 8,644,768 B2 | 2/2014 | Kluge |
| 8,744,377 B2 | 6/2014 | Rimini |
| 8,767,869 B2 | 7/2014 | Rimini |
| 8,823,577 B2 | 9/2014 | Smid |
| 8,836,581 B2 | 9/2014 | Nysen |
| 8,836,601 B2 | 9/2014 | Sanford |
| 8,837,615 B2 | 9/2014 | Baldemair |
| 8,842,044 B2 | 9/2014 | Nysen |
| 8,860,629 B2 | 10/2014 | Shtrom |
| 8,897,269 B2 | 11/2014 | Ji |
| 8,918,692 B2 | 12/2014 | Braithwaite |
| 8,976,641 B2 | 3/2015 | Choi |
| 9,019,165 B2 | 4/2015 | Shtrom |
| 9,036,749 B2 | 5/2015 | Choi |
| 9,054,795 B2 | 6/2015 | Choi |
| 9,059,879 B2 | 6/2015 | Jaeger |
| 9,071,313 B2 | 6/2015 | Monsen |
| 9,077,071 B2 | 7/2015 | Shtrom |
| 9,077,407 B2 | 7/2015 | Koren |
| 9,077,421 B1 | 7/2015 | Mehlman |
| 9,093,758 B2 | 7/2015 | Kish |
| 9,130,693 B2 | 9/2015 | Reznik |
| 9,276,682 B2 | 3/2016 | Bharadia |
| 9,277,591 B2 | 3/2016 | Amini |
| 9,281,979 B2 | 3/2016 | Maltsev |
| 9,337,885 B2 | 5/2016 | Mehlman |
| 9,571,205 B1 | 2/2017 | Suarez |
| 9,608,705 B2 | 3/2017 | Maru |
| 9,622,098 B2 | 4/2017 | Emmanuel |
| 9,713,010 B2 | 7/2017 | Khandani |
| 2001/0010495 A1 | 8/2001 | Helms |
| 2002/0032004 A1 | 3/2002 | Widrow |
| 2002/0097810 A1 | 7/2002 | Seki |
| 2003/0114128 A1 | 6/2003 | Haapoja |
| 2003/0189974 A1 | 10/2003 | Ferry |
| 2003/0189975 A1 | 10/2003 | Fullerton |
| 2004/0022229 A1 | 2/2004 | Vanness |
| 2004/0132414 A1 | 7/2004 | Sendyk |
| 2005/0020771 A1 | 1/2005 | Ahmed |
| 2005/0052330 A1 | 3/2005 | Mehltretter |
| 2005/0057420 A1 | 3/2005 | Lin |
| 2005/0083863 A1 | 4/2005 | Umei |
| 2005/0275576 A1 | 12/2005 | Fudge |
| 2006/0045063 A1 | 3/2006 | Stanford |
| 2006/0109067 A1 | 5/2006 | Shtrom |
| 2006/0192720 A1 | 8/2006 | Shtrom |
| 2007/0026804 A1 | 2/2007 | Ishibashi |
| 2007/0026807 A1 | 2/2007 | Kish |
| 2007/0036353 A1 | 2/2007 | Reznik |
| 2007/0063875 A1 | 3/2007 | Hoffberg |
| 2007/0080891 A1 | 4/2007 | De Lustrac |
| 2007/0082617 A1 | 4/2007 | McCallister |
| 2007/0132651 A1 | 6/2007 | Nilsson |
| 2007/0254692 A1 | 11/2007 | McCoy |
| 2008/0009257 A1 | 1/2008 | Safarian |
| 2008/0063113 A1 | 3/2008 | Gao |
| 2008/0107046 A1 | 5/2008 | Kangasmaa |
| 2008/0123851 A1 | 5/2008 | Guccione |
| 2008/0129640 A1 | 6/2008 | Shtrom |
| 2008/0233966 A1 | 9/2008 | Scheim |
| 2009/0092072 A1 | 4/2009 | Imamura |
| 2009/0141900 A1 | 6/2009 | Ye |
| 2009/0186582 A1 | 7/2009 | Muhammad |
| 2009/0213770 A1 | 8/2009 | Mu |
| 2009/0253385 A1 | 10/2009 | Dent |
| 2009/0284218 A1 | 11/2009 | Mohammadian |
| 2010/0003931 A1 | 1/2010 | Krishnan |
| 2010/0008406 A1 | 1/2010 | Sawai |
| 2010/0020771 A1 | 1/2010 | Ji |
| 2010/0022201 A1 | 1/2010 | Vandenameele |
| 2010/0086012 A1 | 4/2010 | Rofougaran |
| 2010/0165866 A1 | 7/2010 | Sachse |
| 2010/0165895 A1 | 7/2010 | Elahi |
| 2010/0167662 A1 | 7/2010 | Kluge |
| 2010/0232324 A1 | 9/2010 | Radunovic |
| 2010/0248714 A1 | 9/2010 | Kang |
| 2010/0271987 A1 | 10/2010 | Chiu |
| 2010/0321245 A1 | 12/2010 | Aoki |
| 2011/0110451 A1 | 5/2011 | Tsai |
| 2011/0143655 A1 | 6/2011 | Ahn |
| 2011/0149714 A1 | 6/2011 | Rimini |
| 2011/0268100 A1 | 11/2011 | Gorokhov |
| 2012/0027113 A1 | 2/2012 | Gaal |
| 2012/0068904 A1 | 3/2012 | Shtrom |
| 2012/0087424 A1 | 4/2012 | Brown |
| 2012/0159279 A1 | 6/2012 | Braithwaite |
| 2012/0200158 A1 | 8/2012 | Takei |
| 2012/0201153 A1 | 8/2012 | Bharadia |
| 2012/0201173 A1 | 8/2012 | Jain |
| 2012/0220246 A1 | 8/2012 | Kushnir |
| 2012/0281834 A1 | 11/2012 | Reznik |
| 2012/0300680 A1 | 11/2012 | Pietsch |
| 2013/0010851 A1 | 1/2013 | Jaeger |
| 2013/0044791 A1 | 2/2013 | Rimini |
| 2013/0089009 A1 | 4/2013 | Li |
| 2013/0099974 A1 | 4/2013 | Wang |
| 2013/0102254 A1 | 4/2013 | Cyzs |
| 2013/0114468 A1 | 5/2013 | Hui |
| 2013/0286903 A1 | 10/2013 | Khojastepour |
| 2013/0301487 A1* | 11/2013 | Khandani ............ H04W 16/14 370/278 |
| 2014/0126675 A1 | 5/2014 | Monsen |
| 2014/0135056 A1 | 5/2014 | Wang |
| 2014/0169236 A1 | 6/2014 | Choi |
| 2014/0204808 A1 | 7/2014 | Choi |
| 2014/0218248 A1 | 8/2014 | Schulz |
| 2014/0219139 A1 | 8/2014 | Choi |
| 2014/0225788 A1 | 8/2014 | Schulz |

(56) References Cited

U.S. PATENT DOCUMENTS

| | | |
|---|---|---|
| 2014/0334322 A1 | 11/2014 | Shtrom |
| 2014/0348032 A1 | 11/2014 | Hua |
| 2015/0029906 A1 | 1/2015 | Jana |
| 2015/0043323 A1 | 2/2015 | Choi |
| 2015/0043685 A1 | 2/2015 | Choi |
| 2015/0049834 A1 | 2/2015 | Choi |
| 2015/0063176 A1 | 3/2015 | Hong |
| 2015/0078217 A1 | 3/2015 | Choi |
| 2015/0139284 A1 | 5/2015 | Choi |
| 2015/0171903 A1 | 6/2015 | Mehlman |
| 2015/0188646 A1 | 7/2015 | Bharadia |
| 2015/0223173 A1 | 8/2015 | Khojastepour |
| 2015/0236750 A1 | 8/2015 | Choi |
| 2015/0249997 A1 | 9/2015 | Clegg |
| 2015/0263780 A1 | 9/2015 | Mehlman |
| 2015/0280893 A1 | 10/2015 | Choi |
| 2015/0318976 A1 | 11/2015 | Eltawil |
| 2015/0333847 A1 | 11/2015 | Bharadia |
| 2015/0334745 A1 | 11/2015 | Zhao |
| 2015/0341125 A1 | 11/2015 | Bharadia |
| 2015/0341879 A1 | 11/2015 | Shtrom |
| 2016/0127876 A1 | 5/2016 | Kish |
| 2016/0226653 A1 | 8/2016 | Bharadia |
| 2016/0249376 A1 | 8/2016 | Kish |

FOREIGN PATENT DOCUMENTS

| | | |
|---|---|---|
| JP | 10502220 A | 2/1998 |
| KR | 1020040096404 | 11/2004 |
| KR | 1020070072629 | 7/2007 |
| KR | 1020120080231 | 7/2012 |
| WO | 1994028585 | 12/1994 |
| WO | 1996022643 | 7/1996 |
| WO | 2011065020 | 6/2002 |
| WO | 2003098823 | 11/2003 |
| WO | 2004007497 | 1/2004 |
| WO | WO2009156510 | 12/2009 |
| WO | 2010005951 | 1/2010 |
| WO | 2010051232 | 5/2010 |
| WO | 2012042256 | 4/2012 |
| WO | 2016014016 | 1/2016 |

OTHER PUBLICATIONS

Chen, B., et al., "Quantization Index Modulation: A Class of Provably Good Methods for Digital Watermarking and Information Embedding", IEEE Transaction on Information Theory, vol. 47, No. 4, May 2001, pp. 1423-1443.

EP Extended European Search Report for EP App. No. 13790076.7, dated Mar. 2, 2016, 8 pages.

EP Extended Search Report for EP App. No. 13790160.9-1874, dated Jan. 16, 2016, 9 pages.

Extended European Search Report for EP App. 13790948.7, dated Nov. 4, 2015, 9 pages.

Gharavol, E., et al., "Robust Joint Optimization of MIMO Two-Way Relay Channels With Imperfect CSI", Communication, Control, and Computing (Allerton), 2011 49th Annual Allerton Conference on, IEEE, Sep. 28, 2011, pp. 1657-1664, XP032085749, DOI: 10.1109/ALLERTON.2011.6120368, ISBN: 978-1-4577-1817-5.

International Search Report and Written Opinion for PCT/US2013/040822 dated Jul. 18, 2013.

International Search Report and Written Opinion for PCT/US2014/042136 dated Dec. 9, 2014.

International Search Report and Written Opinion for PCT/US2014/051137 dated Nov. 24, 2014.

International Search Report and Written Opinion from PCT/US2014/050968 dated Nov. 19, 2014.

International Search Report for PCT/US2013/040818 dated Jul. 24, 2013.

Jain, M., "Practical, Real-Time, Full Duplex Wireless", MobiCom '11, Sep. 19-23, 2011, Las Vegans, NC, USA, 2011, 12 pages.

Jung Il, ., "Achieving single channel, full duplex wireless communication", Proceedings from the Annual International Conference on Mobile Computing and Networking, MOBICOM—MOBICOM' 10 and MOBIHOC' 10—Proceedings of the 16th Annual International Conference on Mobile Computing and Networking and 11th ACM International Symposi, Sep. 20, 2010, pp. 1-12, XP002696691.

Korean Patent Abstract of 1020070072629, dated Jul. 4, 2007, 1 page.

McMichael, J. G., et al., "Optimal tuning of analog self-interference cancellers for full-duplex wireless communication". IEEE, Fiftieth Annual Allerton Conference, Oct. 1-5, 2012, p. 246-251.

Persson, D., et al., "Joint Source-Channel Coding for the MIMO Broadcast Channel", IEEE Transactions on Signal Processing, vol. 60, No. 4, Apr. 2012, pp. 2085-2090.

Provisional Application, entitled: "Adaptive Non-Linear Digital Cancellation for Full-Duplex Radios", U.S. Appl. No. 61/864,453, filed Aug. 9, 2013.

Provisional Application, entitled: "Cancellation Circuit With Variable Delay and Amplifier", U.S. Appl. No. 61/876,663, filed Sep. 11, 2013.

Provisional Application, entitled: "Feed Foward Signal Cancellation", U.S. Appl. No. 61/736,726, filed Dec. 13, 2012.

Provisional Application, entitled: "Frequency Independent Analog Cancellation Circuit", U.S. Appl. No. 61/864,459, filed Aug. 9, 2013.

Provisional Application, entitled: "Hybrid IF/RF Digital Cancellation Architectures for Full-Duplex Radios", U.S. Appl. No. 61/915,431, filed Dec. 12, 2013.

Provisional Application, entitled: "Interference Cancellation Architectures With Frequency Isolation", U.S. Appl. No. 62/030,240, filed Jul. 29, 2014.

Provisional Application, entitled: "Method and Apparatus for Mitigating Phase Noise to Improve Self-Interference Cancellation", U.S. Appl. No. 61/865,943, filed Aug. 14, 2013.

Provisional Application, entitled: "Near Band Cancellation", U.S. Appl. No. 61/970,852, filed Mar. 26, 2014.

Provisional Application, entitled: "Self Interference Cancellation Architecture for In-Band Full Duplex Relay Node", U.S. Appl. No. 61/871,519, filed Aug. 29, 2013.

Provisional Application, entitled: "Signal Cancellation Using Feedforward and Feedback", U.S. Appl. No. 61/760,518, filed Feb. 4, 2013.

Provisional Application, entitled: "Techniques for Digital Interference Cancellation", U.S. Appl. No. 62/002,578, filed May 23, 2014.

Provisional Application, entitled: "Tunable Self Interference Cancellation", U.S. Appl. No. 61/950,742, filed Mar. 10, 2014.

Provisional Application, entitled: "Tuning Algorithm for Multi-Tap Signal Cancellation Circuit", U.S. Appl. No. 61/754,447, filed Jan. 18, 2013.

Vaze, R., et al., "To Code or Not to Code in Multi-Hop Relay Channels", arxiv.org, Cornell University Library, May 20, 2008, XP080418936, 30 pages.

Aono T et al: "Wireless secret key generation exploiting reactance-domain scalar response of multipath fading channels", IEEE Transactions on Antennas and Propagation, IEEE Service Center, Piscataway, NJ, US, vol. 53, No. 11, Nov. 1, 2005 (Nov. 1, 2005), pp. 3776-3784, XP001512766, ISSN: 0018-926X, DOI: 10.1109/TAP.2005.858853.

Khandani Amir K: "Two-way (true full-duplex) wireless", 2013 13th Canadian Workshop on Information Theory, IEEE, Jun. 18, 2013 (Jun. 18, 2013), pp. 33-38, XP032495648, DOI: 10.1109/CWIT.2013.6621588 , [retrieved on Oct. 4, 2013].

\* cited by examiner

METHODS FOR TRAINING OF FULL-DUPLEX WIRELESS SYSTEMS

CROSS-REFERENCE TO RELATED APPLICATIONS

This application claims the benefit of U.S. Provisional Application No. 62/294,913 filed Feb. 12, 2016, entitled "METHODS FOR TRAINING OF FULL-DUPLEX WIRELESS SYSTEMS", reference of which is hereby incorporated in its entirety.

U.S. patent application Ser. No. 13/893,288, filed May 13, 2013, entitled "Full Duplex Wireless Transmission With Self-Interference Cancellation" is incorporated herein by reference in its entirety.

BACKGROUND OF THE INVENTION

A communication link with capability to support connections in both transmit and receive directions at the same time and over the entire frequency band is called full-duplex, or two-way. In contrast, a link that can support connection in only one direction at a time (over a given frequency band) is called one-way or half-duplex. Current wireless systems are one-way and rely on either separate time slots (time division duplex) or separate frequency bands (frequency division duplex) to transmit and to receive. These alternatives have their pros and cons, but both suffer from lack of ability to transmit and to receive concurrently over entire frequency band. Even in the context of Orthogonal Frequency Division Multiple Access (OFDMA), where different frequency tones are used to simultaneously service multiple users, there is no method known to use the OFDMA tones in opposite directions. A similar shortcoming exists in the context of Code Division Multiple Access (CDMA). Although full-duplex wireless is theoretically possible, its implementation is difficult due to an excessive amount of self-interference, i.e., the interference each transmitter generates to its own receiver(s).

Full-duplex communication is currently used in many applications, e.g., wired telephones, digital subscriber line, wireless with directional antennas, and free-space optics. The impact of full-duplex links in these earlier applications is limited to doubling the rate by providing two symmetrical pipes of data flowing in opposite directions. In contrast, in multi-user wireless systems, due to the broadcast nature of transmission (everyone hears everyone else), full-duplex capability has the potential to do more than merely doubling the rate. A summary of some of the benefits of full-duplex are as follow.

Full-duplex facilitates wireless networking. In particular, the ability to handle asynchronous users enables superimposing a half-duplex, low bit rate, low power, easy to detect network for control signaling superimposed (physical overlay, rather than logical) on top of the network of primary full-duplex data links. The superimposed links are separated from the primary full-duplex data links in the code domain, and use time multiplexing plus Carrier Sense Multiple Access (CSMA) among themselves. However, the conventional problems of CSMA are avoided as control links operate in parallel with primary full-duplex data links. The physical layer of control links is designed such that full-duplex data links can detect and cancel the interference caused by the superimposed control links.

Full-duplex enhances security through desirable jamming.

Full-duplex facilitates multi-node distributed & collaborative signaling, including realization of Network Information Theoretic setups, and cognitive wireless.

Full-duplex, through exploiting feedback, improves point-to-point throughput, and enables ultra-low power transmission.

Full-duplex doubles the point-to-point throughput.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Figure 1:
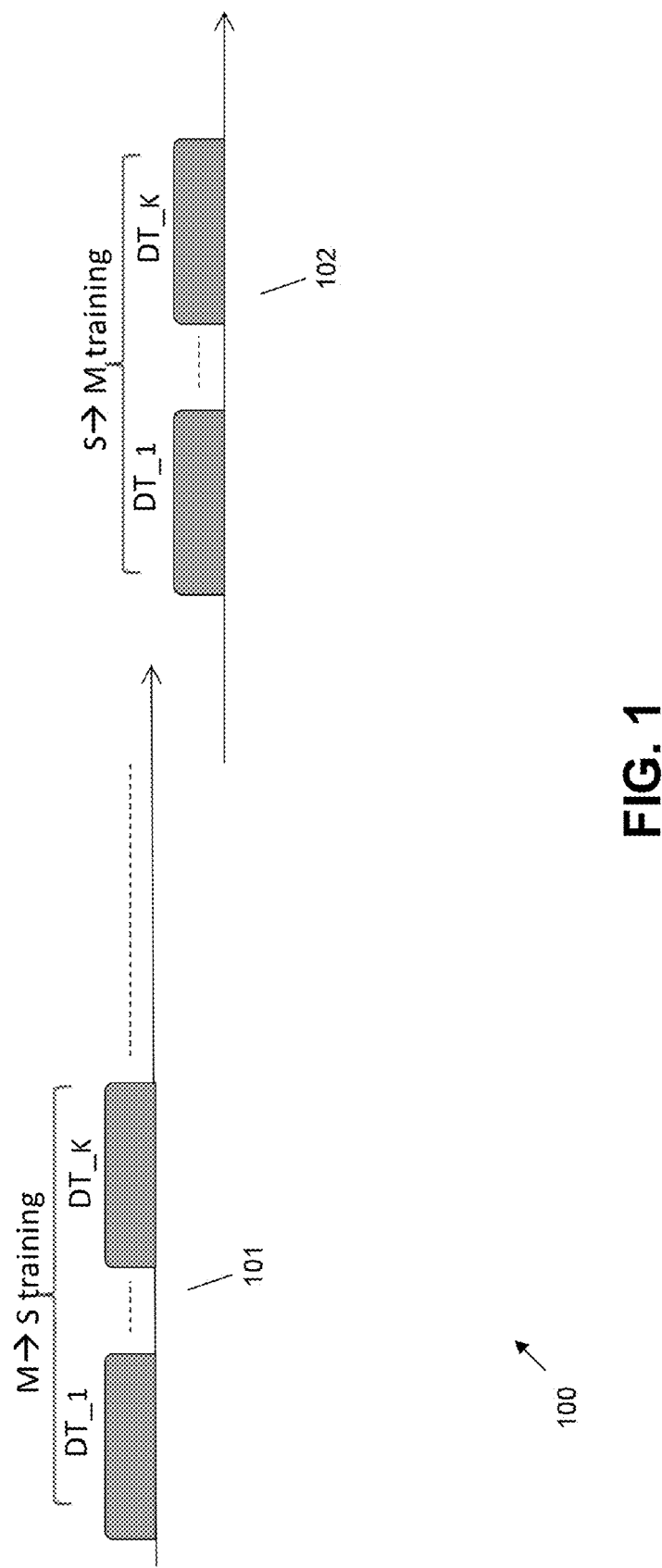

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

FIG. 1 illustrates an exemplary method of training a local (master) and remote (slave) full duplex transceiver according to an embodiment.

Figure 2:
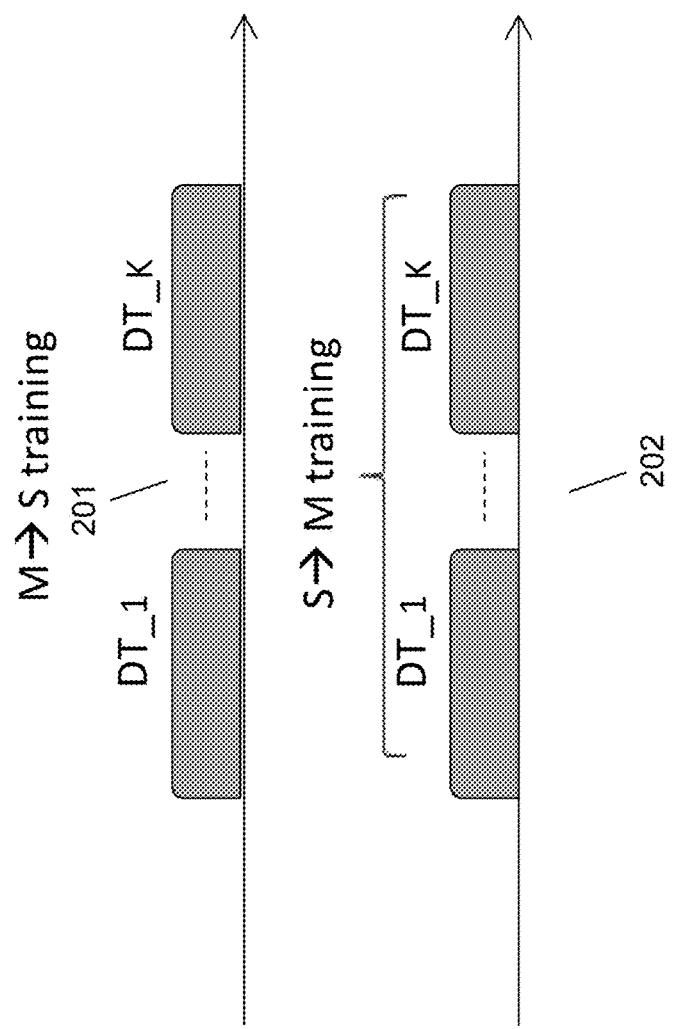

FIG. 2 illustrates another exemplary method of training a local (master) and remote (slave) full duplex transceiver according to an embodiment.

Figure 3:
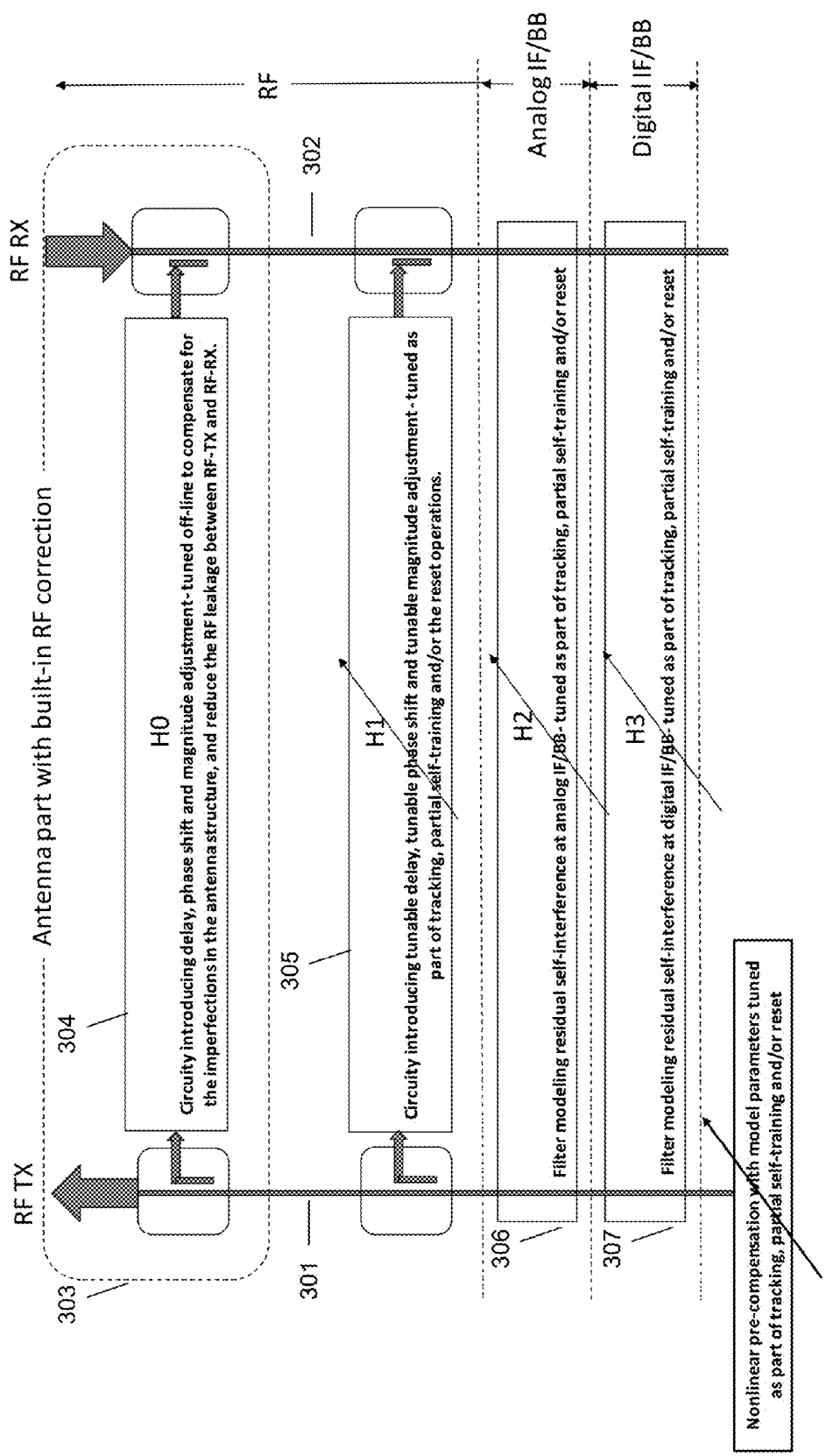

FIG. 3 is a functional block diagram of a full-duplex transceiver according to an embodiment.

Figure 4:
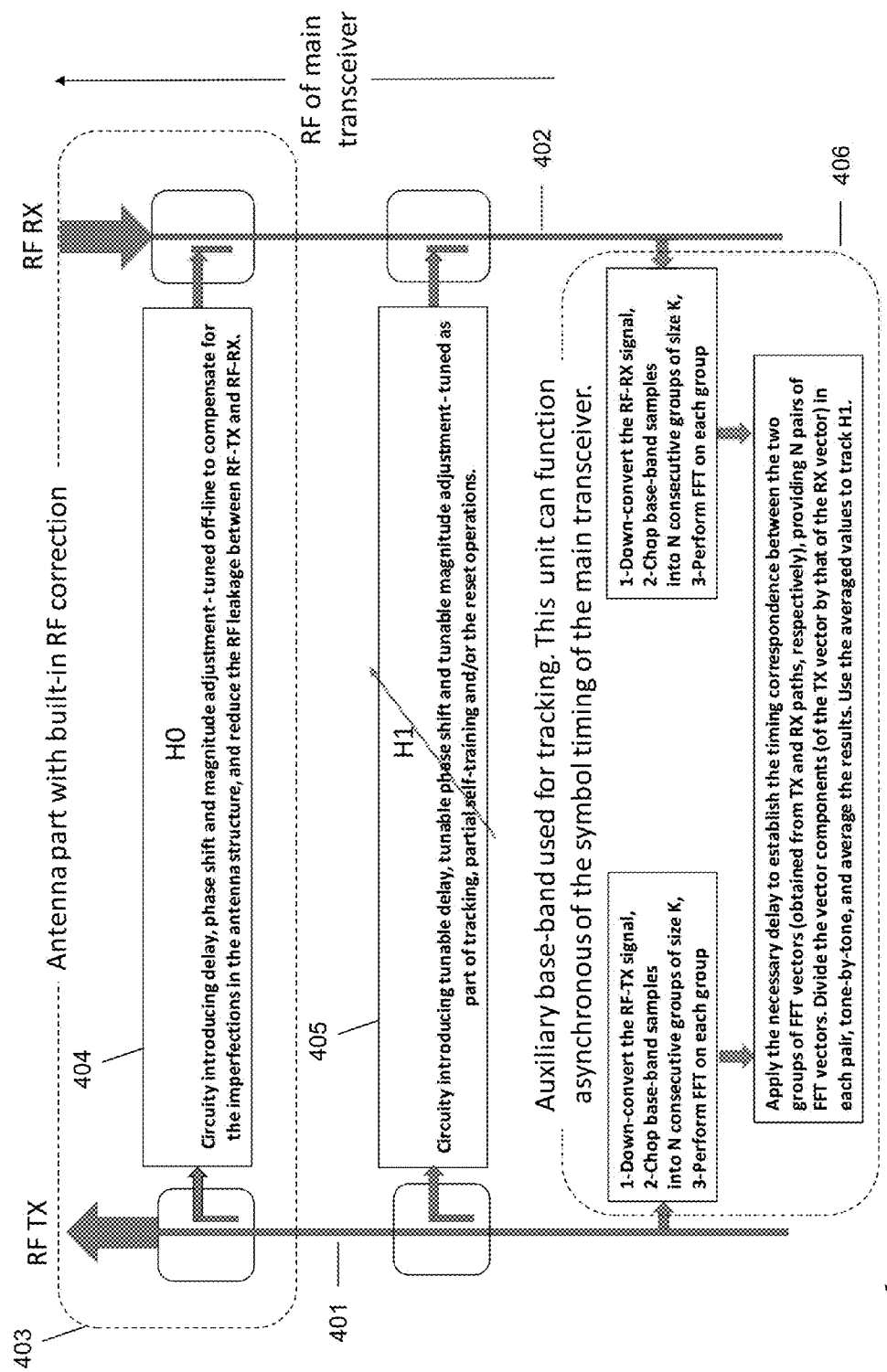

FIG. 4 is a functional block diagram of a stand-alone full-duplex radio-frequency adapter.

Figure 5:
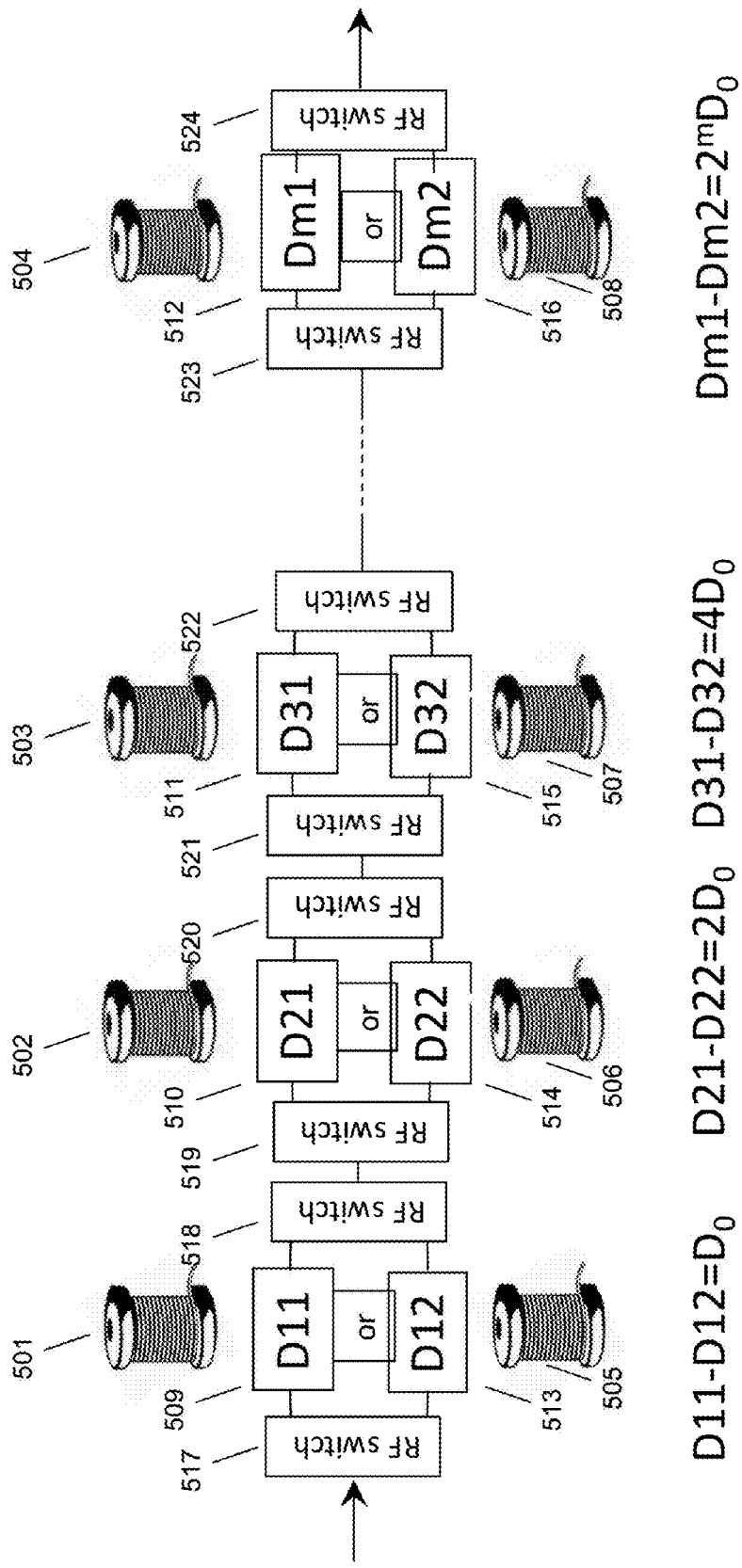

FIG. 5 is a block diagram of a variable delay line used in some embodiments.

DETAILED DESCRIPTION OF THE INVENTION

A detailed description of illustrative embodiments will now be provided with reference to the various Figures. Although this description provides detailed examples of possible implementations, it should be noted that the provided details are intended to be by way of example and in no way limit the scope of the application.

To cancel the self-interference, a corrective signal (CS) is generated from the Transmit Signal (TS) and added to the received signal to cancel the self-interference. Such a correction can be performed in the analog domain, i.e., at the RF and/or at an Analog IF (AIF) and/or at Analog BaseBand (ABB). It can be also performed at the digital domain, e.g., at the Digital IF (DIF) and/or at the digital BaseBand (DBB). A combination of "analog correction" and "digital correction" is possible as well.

To form a corrective signal, a model is used to express the self-interference signal in terms of the transmitted signal. A good portion of the model can be captured in the form of a linear transformation. However, in many situations, a simple linear model fails to accurately capture the characteristics of the self-interference signal. In such a case, a cascade of linear and non-linear transformations is used. The simplest form in this category is composed of a "pre-processing operation" at the transmitter, and a "post-processing operation" at the receiver local to that transmitter. In one example, the pre-processing operation is composed of the cascade of a digital non-linear complex (phase and magnitude) transformation in the (digital baseband or IF) time (or frequency) domain, followed by a digital linear complex transformation in the (digital) frequency (or time) domain applied to each orthogonal frequency division multiplexing (OFDM) tone. Typically, the nonlinear part aims to linearize the transmit chain, in particular, linearize the Power Amplifier (PA) through adaptive non-linear pre-compensation, and the linear part captures the linear part of the path causing the leakage from the transmit chain to the receive chain. The order of the linear and nonlinear parts in the cascade applied in the transmit chain can be exchanged, also a chain of multiple linear plus non-linear operations can be used.

In a preferred embodiment, the pre-processing part is composed of the cascade of a digital linear complex transformation in the (digital baseband or IF) frequency domain (applied to each OFDM tone), followed by a digital non-linear complex (phase and magnitude) transformation in the time domain.

The corrective signal can be applied at the RF (upon modulation to the respective RF carrier), and/or at the analog IF, and/or at the analog baseband, and/or at the digital baseband. In all these cases, the pre-processing operation, which is used to form the corrective signal, can be used in combination with a post-processing operation, which is applied to the received signal in digital base-band of the local receiver prior to the addition of the corrective signal. Other possibilities and combinations composed of a larger number and more complex cascade of linear and non-linear components can be formed as well.

In all above configurations, one may need to construct linear as well as non-linear parametric models for different parts involved in forming the corrective signal, and in modifying the received signal prior to the application of such a formed corrective signal to it. The final goal is to cancel the effect of the self-interference such that the received signal faithfully represent the data-bearing signal sent by the distant node.

An embodiment concerns extracting the information required to build these models, in particular relying on the knowledge of the transmitted data. The final goal is to minimize the training overhead, and at the same time, improve the performance by enabling gradual adjustments (tracking in time) of the self-interference cancellation and signal reconstruction mechanisms.

In legacy communication systems, the distant node constructs a model (channel model between the two ends of the link, from TX to its distant RX) to capture the effect of the transmission medium on the transmitted data, and enable reliable data detection. This operation of performing training between a transmitter and the corresponding distant receiver (receiver at the other end of the communication link) is referred to as "distant training" hereafter. That is, distant training signals are signals that are predetermined, and are known to the transmitter and the distant end receiver such that the receiver may determine the channel characteristics by observing the variations in the received signals from their predetermined values. This operation is in contrast to "local self-training for reduction of self-interference" which involves a transmitter and its local receiver. Distant training is typically achieved by sending known signals merely targeting the purpose of providing the distant receiver with the information required to construct the channel model. Examples include preambles and/or pilots. Another approach used in legacy systems to perform distant training fall under the category of "blind methods", which essentially rely on the statistical properties of the signal received from the distant transmitter to construct, and/or help in constructing, the channel model for signal detection. The situation in full-duplex differs from such legacy scenarios in an important way: in learning the channel between transmitter and its local receiver (TX and RX within a node), the actual data is available, which can be used to continually measure the self-interference channel. In other words, in full-duplex wireless, the data sent to the distant node is entirely known at the transmitter, which means the entire transmitted data, in addition to the distant training signals (such as pilots) sent for distant training, can be used for the construction of the required linear and nonlinear models involved in reducing the self-interference. This is called "data-based self-training" hereafter. In some embodiments, distant-training signals are symbols that are transmitted by time-multiplexing the symbols in time slots. In some embodiments, a first distant-training symbol is transmitted from a first transceiver to a second transceiver, and a second distant-training symbol is transmitted from the second transceiver to the first transceiver. For some embodiments, the first and second symbols are transmitted in the same time slot. In some embodiments, the first and second symbols are transmitted in different time slots.

In the following embodiments, "sample timing" refers to timing and synchronization at the sample level, wherein synchronization of OFDM symbols should be realized with a sample timing accuracy limited by the length of the cyclic prefix. "Symbol timing" and "symbol synchronization" refers to establishing correspondence between pairs of OFDM symbols at a TX and its corresponding local RX.

In one embodiment, which assumes and relies on OFDM structure, to perform the data-based self-training, the received signal in digital baseband is chopped into OFDM symbols (with a sample timing matched with the OFDM sample timing used at the transceiver of the full-duplex node), then each such OFDM symbol is divided tone-by-tone by the OFDM symbol corresponding to the transmit data in the same symbol interval. This forms a complex vector, which may be used to construct and/or fine-tune the linear model used for the formation of the corrective signal. To reduce the effect of noise and other imperfections, several such complex vectors can be formed over successive OFDM symbols, e.g., one vector for each OFDM symbol, and then the resulting complex vectors, called "synchronous data-based self-training coefficient vectors" hereafter, are averaged tone-by-tone. The resulting averaged vector is then used to track the model(s) used for the construction of the corrective signal.

In another embodiment, to perform the data-based self-training, the corrective signal is first applied to remove a main portion of the self-interference, and then the linear model is formed by dividing of the resulting residual OFDM symbol tone-by-tone by its corresponding transmitted OFDM symbol (to form the "synchronous data-based self-training coefficient vectors"). In this case, the resulting model captures the deviations in the linear model used for the construction of the corrective signal and can be used for its fine-tuning. This provides means to track the model in time to adapt to the time variations in the model, for example those due to physical movements and/or drifts in the characteristics of the circuit components.

In another embodiment, the model is formed based on the entire received signal, prior to the application of the corrective signal (this refers to correction at the digital domain).

In other embodiments, the information gathered from the local data for the purpose of self-training, is used to find the parameters of both linear and nonlinear models. A preferred embodiment is based on tracking the linear part at short intervals, and using the corrected signal over a longer duration to find the non-linear part.

In the methods of the above embodiments, the data transmitted by the distant node acts as noise, and to remove the effect of this noise, a number of data-based self-training coefficient vector are averaged tone-by-tone. It is also possible to first decode the data sent by the distant node, remove its effect from the received signal, and then perform the above mentioned averaging for the purpose of data-based self-training. It is also possible to iterate between cycles of an iterative soft decoder for the channel code and the removal of the self-interference to improve the performance of the channel decoder (through gradual removal of the self-interference).

The above embodiments maintain the structure of the OFDM symbols. In particular, data-based self-training operates over OFDM symbols while maintaining synchronization between the OFDM symbol transmitted and the OFDM symbol received at the local receiver. Such configurations involve and require access to the baseband of the full-duplex transceiver. In some embodiments, it is desirable to apply the data-based self-training without access to the main baseband of the full-duplex transceiver. Another embodiment corresponds to using a window size for data-based self-training that differs from the size of the OFDM symbols. For example, OFDM size can be 2048, while data-based self-training is performed over shorter windows of say size 64. Another embodiment corresponds to the situation that the transceiver does not rely on OFDM at all.

To accommodate such scenarios, in another embodiment, the transmitted signal (transmit digital baseband) is divided into consecutive segments of a fixed size, say K, without consideration of the underlying structure (which could be OFDM or some form of time domain signaling). Then, each of these K time symbols are taken into the frequency domain using a K point FFT. The received signal (receive digital baseband) is similarly divided into consecutive segments of the same size, K, which are taken into the frequency domain using a K point FFT. The complex FFT vector formed at the receive baseband is then divided, tone-by-tone, by the complex FFT vector formed at the transmit baseband. The resulting complex vectors, called "asynchronous data-based self-training coefficient vectors" hereafter, are averaged tone-by-tone. The resulting averaged vector is then used to track the model(s) used for the construction of the corrective signal. In this case, the memory from the previous time sample, as well as the data transmitted by the distant node acts as noise, and to remove the effect of this noise, a larger number of "asynchronous data-based self-training coefficient vectors" should be averaged.

In another embodiment using decision feedback, the data sent by the distant node is first estimated and subtracted from the received signal, and then the remainder (again gathered and combined over multiple transmissions) is used to correct the model(s) for the construction of the corrective signal, and/or for nonlinear pre/post-compensations. In particular, data can be first decoded over a Forward Error Correction (FEC) frame to reduce the effect of the channel noise, and then the result, after re-modulating and transferring into the time, is used in the loop for decision feedback. Iterative methods based on probability propagation, iterating between channel decoder for estimation of data sent from the distant node and estimation of the model parameters for modelling residual self-interference, can be applied to further reduce the effect of the noise.

As discussed above, in various embodiments, complex vectors are gathered (in a synchronous or asynchronous manner) over several consecutive transmissions by dividing (in the frequency domain) each vector of received signal, tone-by-tone, by its corresponding transmit signal, while preserving the correspondence in time between successive transmit and successive receive vectors in a manner analogous to OFDM timing requirements. In this case, data transmitted by the transmitter plays a role analogous to pilots for the training of the receiver at the same node (in order to model/estimate and cancel the self-interference). To reduce the effect of the noise several such vectors will be formed over successive time segments, and the results will be averaged. Examples of noise include "the data transmitted by the distant node which is unknown and acts as noise", and/or "signal dependent imperfections within the same node", and/or "the leakage due to memory from previous sample". Overall, this operation is analogous to averaging of pilots in legacy systems. On the other hand, typically pilots used in legacy systems contain the same energy, and consequently, the averaging operation for the noise removal will be a simple (unweighted) average. On the other hand, in the case of full-duplex systems, the transmitted signal (within a given window of samples used for data-based self-training) does not contain the same energy over all its frequency components.

Another embodiment uses a weighted averaging, with weights selected to maximize the resulting average mean square estimation error of the model parameters, or the signal-to-noise ratio of the model parameters. An example is the use of maximum ratio combining, in which each receive vector is divided tone-by-tone by the components of its corresponding transmit vector, and the results are weighted based on the magnitude of the signal in each tone prior to averaging.

The explanations so far have been primarily around the construction of the linear model capturing the formation of the residual self-interference from the transmit signal, which occurs due to leakage from the transmit chain to the receive chain. Several nonlinear models also exist that could benefit from a similar procedure exploiting the knowledge of the transmitted data. First, a basic application of the nonlinear modeling is in the form of a pre-compensation to linearize the transmit chain, in particular to linearize the power amplifier (PA).

In an embodiment, the received signal in the frequency domain is compared tone-by-tone by its corresponding transmit signal and the results ("synchronous/asynchronous data-based self-training coefficient vectors") are used to form and adapt (track) the nonlinear model for the pre-compensation. A variety of techniques exist in the literature in order to model nonlinearity, as well as methods to compute the parameters of such a non-linear model, which will be known to individuals skilled in the art.

In another embodiment, such an adaptive nonlinear pre-compensation model is used in conjunction with the adaptive linear model to form and track the residual self-interference.

In another embodiment, the comparison of the received and transmit signals over consecutive equal-size segments in time are used to form and/or track three models: (1) adaptive nonlinear pre-compensation model, (2) model for the linear compensation of the residual self-interference, and (3) model for the nonlinear processing of the received signal in the time domain (prior to data detection) to compensate for any remaining nonlinearities.

The methods of an embodiment are explained in terms of using the transmit signal and the receive signal in the frequency domain to extract the linear part of the model as a vector of coefficients in the frequency domain. The result can then be used to fine-tune the frequency domain filter used for the construction of the corrective signal. This means, the residual corrective linear filter may be formed in the frequency domain, and may also be applied in the frequency domain.

Another embodiment relies on forming the residual corrective linear filter in the frequency domain and then applying it in the time domain, for example as a Finite Impulse Response (FIR) filter, or less desirably as an Infinite Impulse Response (IIR) filter. Other combinations are possible as well and will be clear to individuals skilled in the art.

The methods of an embodiment can be used to gradually update the linear as well as the non-linear models explained earlier which are used in the operation of a full-duplex node. On the other hand, if the structure governing such models changes abruptly with time, then such a gradual fine-tuning and continual model tracking may not be sufficient to capture abrupt changes in time. This involves the use of additional special-purpose "self-training" symbols, analogous to pilots or known preambles used for "distant training". Hereafter, methods which rely on such dedicated training symbols for the purpose of self-training are said to "reset" the system. "Reset" can have different levels of intensity in terms of what is being trained using dedicated self-training signals (which may be symbols for some embodiments). The system may have a "full reset" or a "partial reset". There are many different forms of partial reset distinguished based on their level of intensity (what is being trained relying on "dedicated self-training symbols"). In contrast, methods which rely on the "transmitted data" and/or "symbols for distant training" are called "tracking techniques". Transmission of dedicated symbols for self-training can impose a heavy overload on the available resources. To reduce this overload, an embodiment includes using continual model tracking using the transmit data, enhanced by the sporadic use of "dedicated self-training symbols", referred to as "dedicated self-training" hereafter, as the need arises. To decide when to start the self-training phase, an embodiment computes an estimate of the power of residual self-interference by averaging the power of residual self-interference over time, and then enters into the self-training mode when the power of the residual self-interference, or equivalently signal-to-noise-plus-interference-ratio (SINR), at either ends of the link exceeds certain predetermined threshold. A "dedicated self-training" phase interrupts the operation of the full-duplex link, and in particular, the party on the other end of the full-duplex link should be informed that a reset is deemed necessary.

Distant training can be performed using half-duplex mode, or full-duplex mode. Depending on this distinction, the hand-shaking is referred to as "bi-sided handshaking" or "one-sided handshaking".

In an embodiment, each party uses explicit control frames to inform its counter party of its decision to initiate a self-training phase. This is referred to as "explicit handshaking", which can be "bi-sided" or "one-sided". Nodes also use a second control frame to inform their counter party once their self-training phase is successfully completed. To reduce the overload on the system, another embodiment relies on "embedded handshaking", which can be "bi-sided" or "one-sided". Embedded handshaking embeds the handshaking information in the structure of "distant training symbols".

In addition to self-trainings relevant to self-interference, the two nodes forming a full-duplex link may send training signals to teach their counter node of the channels between the two (channel from A→B and channel from B→A). Frequency of such a training between distant nodes is governed by the rate of variations in the channel between the two nodes and is typically much higher than the rate of the change in the channel governing the self-interference. In a preferred embodiment, the training signals sent between distant nodes are duplexed in time (half-duplex). In such a setup, the training signal sent from node A to node B, and vice versa, can be heard by the local receiver of node A without any interference from node B. The corresponding received signals can be used for partial self-training, as well as for measuring the power of the residual self-interference. This is considered as part of "data-based self-training" as it does not require sending "dedicated training symbols for the purpose of self-training".

An embodiment includes other forms of embedded handshaking as well. Consider a master-slave (M→S and S→M) configuration for the two distant nodes with half-duplex distant training. In one embodiment, the reset operation starts at the master node. In case the residual self-interference measured at the master is too high, the master node initiates a reset phase. Master can then inform the slave node of this decision using embedded handshaking by simply not entering into a silent mode (which would normally allow the slave to send the half-duplex training signal for teaching of the channel S→M to the master). Upon completion of the self-training, the master informs the slave by sending a predetermined OFDM symbol, indicating "self-training complete". Then, slave sends the training signal for teaching of the channel S→M to the master, while doing a partial self-training based on hearing the same training signal. At the same time, slave measures the power of the residual self-interference at its end. If slave realizes a reset is required at its end, it will request the master to initiate a reset phase. The self-training phase at both the master and the slave can rely on a special OFDM signal which differs from the signals used for distant training in manners that are easily detectable at the other end. For example, the OFDM symbol used for self-training and the one used for distant training can both contain points of Quadrature Phase Modulation (QPSK) constellation, wherein the phases of the QPSK points on each tone of the training symbol used for self-training has 90° or 180° phase shift with respect to the same tone in the OFDMA symbol used for distant training. This enables the receiver, through a simple differential tone-by-tone comparison and averaging of the results, to determine if the other node has started or completed its self-training phase.

In another embodiment, the unit for the self-interference cancellation relies on an auxiliary base-band with RF down-conversion of the local transmit and its corresponding local received signals. Such a unit, called hereafter "stand-alone full-duplex RF box", is directly connected from one end to the RF output of a legacy transmitter and to the RF input of a legacy receiver, and from the other end to a full-duplex antenna. In other words, the full-duplex RF box acts as an interface connecting a full-duplex antenna to a legacy RF transmitter (to do the full-duplex transmission) and to a legacy RF receiver (to do the full-duplex reception). Such RF transmitter and RF receiver can also be the TX/RX ports of a time division duplex (TDD) transceiver (such ports are typically available before the RF front end), or the TX/RX ports of a FDD transceiver, wherein both the transmitter and the receiver are programmed to operate over the same frequency band. In this embodiment, the full-duplex RF box and the legacy transceiver see each other as black boxes. The RF full-duplex box will bring both the outgoing RF signal and the incoming RF signal to the baseband, or to the low IF, use the two signals to derive the model for the self-interference cancelation which will be then applied at the RF level.

FIG. 1 illustrates an exemplary method 100 of training a local (master) and remote (slave) full duplex transceiver according to an embodiment. FIG. 1 shows distant training with half-duplex training signals, with embedded one-sided handshaking to coordinate the need for a reset (reset means sending dedicated signals for self-training).

For one embodiment of M→S (master to slave) training in a half-duplex transceiver, a Master sends K training signals to the slave, aimed at teaching the channel M→S to the slave. A Master uses the same K training signals to perform a partial self-training (see below for examples). A Master measures the power of the residual self-interference, Pr. If Pr is less than a threshold T, then master selects DT_K to have the same structure as DT_1 to DT_K−1 101. This case (case 1) specifies to the slave that a reset (sending dedicated signal for full self-training) is not required, as far as the master is concerned. If not (case 2), then the phase of DT_K, tone-by-tone, is shifted, for example by 180°, with respect the phase of its corresponding tone in DT_1 to DT_K−1 101. This one-sided from master to the salve handshaking specifies to the slave that a reset (sending dedicated signal for full self-training) is required. Slave can distinguish between case 1 and case 2 using a simple differential detection of DT_K vs. DT_1 to DT_K−1 101. If master decides that a reset is required, then the reset process will follow after DT_K is sent to the slave.

For one embodiment of S→M (slave to master) training, a Slave sends K training signal to the slave, aimed at teaching the channel S→M to the master. A Slave uses the same K training signals to perform its partial self-training (see below for examples). A Slave measures the power of the residual self-interference, Pr. If Pr is less than a threshold T, then slave selects DT_K to have the same structure as DT_1 to DT_K−1 102. This (case 1) specifies to the master that a reset (including full self-training) is not required, as far as the slave is concerned. If not (case 2), then the phase of DT_K, tone-by-tone, is shifted, for example by 180°, with respect the phase of its corresponding tone in DT_1 to DT_K−1 102. This (one-sided from slave to the master handshaking) specifies to the master that a reset (sending dedicated signal for full self-training) is required. Master can distinguish between case 1 and case 2 using a simple differential detection of DT_K vs. DT_1 to DT_K−1 102. If the need for a reset is indicated to the master, then the system enters into a reset mode (including full self-training). For one embodiment where distant training is half-duplex, this situation (of S→M training) in the slave occurs if the reset is completed, or has not been deemed necessary from the master's point of view.

FIG. 2 illustrates another exemplary method 200 of training a local (master) and remote (slave) full duplex transceiver according to an embodiment. FIG. 2 shows a distant training with full-duplex training signals, with embedded bi-sided handshaking to coordinate the need for a reset (reset means sending dedicated signals for self-training).

For one embodiment with a full-duplex transceiver, a master and slave send K training signals to each other in the full-duplex mode. These are aimed at teaching the channel S→M to the master, and the channel M→S to the slave. Both master and slave use the K training signals to perform their partial self-training. Master and slave measure the power of the residual self-interference, Pr. If Pr is less than a threshold T, then master/slave select DT_K to have the same structure as DT_1 to DT_K−1 201, 202. This mutual (bi-sided) embedded handshaking specifies to each party if its counter-party requires a reset (reset means sending dedicated signals for full self-training). If Pr at the master/slave is above T, then the phase of DT_K at the master/slave, tone-by-tone, is shifted, for example by 180°, with respect the phase of its corresponding tone in DT_1 to DT_K−1 201, 202. This specifies to the counter party that a reset is required. Master/slave can distinguish between case 1 and case 2 using a simple differential detection of DT_K vs. DT_1 to DT_K−1 201, 202. If the need for a reset is established by either sides, then the system enters into a reset mode, guided by the master. Once the reset is completed, the system starts a new distant training phase.

FIG. 3 is a functional block diagram showing one embodiment 300 of a full-duplex transceiver according to an embodiment, including various levels of self-training and non-linear pre-distortion. FIG. 3 shows one embodiment of a transmit antenna 301, a receive antenna 302, an antenna with built-in RF correction 303 (which may include a filter H0 304), an RF filter H1 305 which may be external to an antenna for some embodiments, an analog IF/BB filter H2 306, and a digital IF/BB filter H3 307.

FIG. 4 is a functional block diagram showing one embodiment 400 of a stand-alone full-duplex radio-frequency adapter with an auxiliary base-band dedicated to training 406, including static RF self-interference cancellation (H0 404) and adaptive RF self-interference cancellation (H1 405). Auxiliary base-band uses local symbols for asynchronous data-based channel estimation in order to tune/track H1 405. FIG. 4 also shows one embodiment of a transmit antenna 401, a receive antenna 402, and an antenna part with built-in RF correction 403.

FIG. 5 is a block diagram of a variable delay line used in some embodiments. FIG. 5 shows a variable delay line with switchable delay elements 509, 510, 511, 512, 513, 514, 515, 516, corresponding to a combination of coaxial cables 501, 502, 503, 504, 505, 506, 507, 508 of appropriate lengths and RF tracks 517, 518, 519, 520, 521, 522, 523, 524. The combination of m delay elements may generate incremental delays equal to any integer multiple of D0, from D11+D21+ D31+ . . . +Dm1 to D11+D21+D31+ . . . +Dm1+$2^{(m+1)}$ D0.

Exemplary embodiments for performing Tracking (TR), Full Training (FT), and Partial Training (PT) are described below. Full Training uses dedicated symbols for self-training of the linear as well the non-linear models in addition to the symbols used for distant training. Partial Training uses dedicated symbols for self-training of the linear filters and data-based training to track the parameters of the non-linear model, in addition to the symbols used for distant training. Tracking uses data-based training, as well as the symbols used for distant training, to track parameters of the linear filters and the non-linear model.

One example of Full Training (FT1) comprises the following processes. Use a dedicated self-training to tune/track H1 and fix H1. Use a dedicated self-training to tune/track H2 and fix H1 and H2. Use a dedicated self-training to tune/ track H3 and fix H1, H2, and H3. Use a dedicated self-training to tune/track parameters of the nonlinear model for pre-compensation.

A first example of Tracking (TR1) comprises the following processes. Use a large set of local symbols (over a relatively long history) to tune/track parameters of the nonlinear model for pre-compensation (typically less frequent than tracking of the linear filters).

One example of Partial Training (PT1) comprises the following processes. Use a dedicated self-training to tune/track H1 and fix H1. Use a dedicated self-training to tune/track H2 and fix H1 and H2. Use a dedicated self-training to tune/track H3 and fix H1, H2, and H3. Use a tracking procedure TR1 to tune/track parameters of the nonlinear model for pre-compensation.

A second example of Tracking (TR2) comprises the following processes. Use a first set of local symbols for data-based channel estimation, apply the result to tune/track H1 and fix H1. Use a second set of local symbols, consecutive to the first set, for data-based channel estimation with H1 determined previous, apply to tune/track H2, and fix H1 and H2. Use a third set of local symbols, consecutive to the first two sets, for data-based channel estimation with H1 and H2 determined previously, apply the result to tune/track H3, and fix H1, H2, and H3. Use a fourth set of local symbols, consecutive to the first, second, and third sets, with the H1, H2, and H3 determined previously, apply the result to tune/track parameters of the nonlinear model for pre-compensation.

A third example of Tracking (TR3) comprises the following processes. Use a first set of local symbols for data-based channel estimation, apply the result to tune/track H1, and fix H1. Use a second set of local symbols (consecutive to the first set) for data-based channel estimation, with H1 determined previously, apply the result to tune/track H2, and fix H1 and H2. Use a third set of local symbols (consecutive to the first and second sets) for data-based channel estimation, with H1 and H2 determined previously, apply the result to tune/track H3, and fix H1, H2, and H3. Use tracking procedure TR1 to tune/track parameters of the nonlinear model for pre-compensation.

A fourth example of Tracking (TR4) comprises the following processes. Use a first set of local symbols for data-based channel estimation and apply the result to tune/track H1. Use tracking procedure TR1 to tune/track parameters of the nonlinear model for pre-compensation.

A fifth example of Tracking (TR5) comprises the following processes. Use a set of local symbols for data-based channel estimation and apply the result to tune/track H2. Use tracking procedure TR1 to tune/track parameters of the nonlinear model for pre-compensation.

A sixth example of Tracking (TR6) comprises the following processes. Use a set of local symbols for data-based channel estimation and apply the result to track H3. Use tracking procedure TR1 to tune/track parameters of the nonlinear model for pre-compensation.

A seventh example of Tracking (TR7) comprises the following processes. Use a set of local symbols for data-based channel estimation and apply the result to tune/track H1.

An eighth example of Tracking (TR8) comprises the following processes. Use a set of local symbols for data-based channel estimation and apply the result to tune/track H3.

In the above examples, the methods involve determining an interference channel response at various layers, denoted as layers H1, H2, H3, etc. Depending on the performance of the self-cancelling interference, the training and tracking procedures may invoke training for various layers, and once training for a given layer has been completed, the sufficiency of ongoing tracking or the need for training at the next layer may be determined based on residual interference energy.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
exchanging radio-frequency signals at a first full-duplex transceiver with a second full-duplex transceiver;
measuring a self-interference signal at the first full-duplex transceiver;
comparing by the first full-duplex transceiver the self-interference signal with a threshold to determine whether the residual self-interference signal exceeds the threshold;
in response to the determination that the residual self-interference signal exceeds the threshold, performing, by the first full-duplex transceiver, a self-training operation, the self-training operation using self-training signals that are phase-shifted versions of a set of distant-training signals.

2. The method of claim 1, further comprising embedding information based on signal-to-interference plus noise ratio in a distant training signal transmitted by the first full-duplex transceiver to the second full-duplex transceiver.

3. The method of claim 1, further comprising embedding information on an index of a layer to use for self-training, including information related to phase of distant-training symbols sent to a distant counterpart.

4. The method of claim 1, wherein performing the self-training operation comprises transmitting the self-training symbols in half-duplex mode and further comprising sending a message from the first full-duplex transceiver to the second full-duplex transceiver to remain silent during the self-training operation.

5. The method of claim 1, wherein performing the self-training operation comprises transmitting the self-training symbols in full-duplex mode.

6. The method of claim 1, wherein the self-training operation comprises:
transmitting a first distant-training symbol of the set of distant-training symbols from the first full-duplex transceiver to the second full-duplex transceiver to teach the second full-duplex transceiver of a channel from the first to second full-duplex transceiver; and
receiving a second distant-training symbol from the second full-duplex transceiver by the first full-duplex transceiver to teach the first full-duplex transceiver of a channel from the second to the first full-duplex transceiver.

7. The method of claim 6, wherein transmitting the first distant-training signal comprises time-multiplexing the first distant-training signal in half-duplex mode.

8. The method of claim 6, wherein transmitting the first distant-training signal comprises time-multiplexing the first distant-training in full-duplex mode.

9. The method of claim 6, wherein transmitting the first distant-training symbol comprises time-multiplexing the first distant-training symbol in a different time slot than a time slot used for receiving the second distant-training symbol.

10. The method of claim 6, wherein transmitting the first distant-training symbol comprises time-multiplexing the first distant-training symbol in a time slot equal to a time slot used for receiving the second distant-training symbol.

11. The method of claim 6, further comprising using the second distant-training symbol to determine self-interference in the channel from the second full-duplex transceiver to the first full-duplex transceiver.

12. The method of claim 11, further comprising performing a self-training operation based on the determined self-interference in the channel from the second full-duplex transceiver to the first full-duplex transceiver.

13. The method of claim 12, further comprising sending a message from the first transceiver to the second transceiver to delay performing a distant training operation if performing a self-training operation.

14. The method of claim 1, wherein the self-training operation comprises transmitting successively first and second distant-training symbols of the set of distant-training symbols from the first full-duplex transceiver to the second full-duplex transceiver with a time interval for the successive transmission that is adapted to a rate of variations in a channel from the first full-duplex transceiver to the second full-duplex transceiver.

15. The method of claim 1, wherein performing a self-training operation comprises transmitting a partial self-training signal that comprises multiple layers of different depths in a nested manner.

* * * * *